United States Patent [19]

Mitsuhashi et al.

[11] 3,708,396
[45] Jan. 2, 1973

[54] PROCESS FOR PRODUCING MALTITOL

[75] Inventors: Masakazu Mitsuhashi, Okayama-shi, Okayama; Mamoru Hirao, Akaiwa-gun, Okayama; Kaname Sugimoto, Okayama-shi, Okayama, all of Japan

[73] Assignee: Hayashibara Company, Okayama, Japan

[22] Filed: Jan. 8, 1969

[21] Appl. No.: 789,912

[30] Foreign Application Priority Data

Jan. 23, 1968 Japan .................................. 43/3862
July 11, 1968 Japan ................................ 43/48921
July 11, 1968 Japan ................................ 43/48922

[52] U.S. Cl. .............. 195/31 R, 260/635 C, 99/141 R
[51] Int. Cl. ............................................... C13d 1/00
[58] Field of Search ............ 195/31; 99/141; 127/37; 260/635 C

[56] References Cited

UNITED STATES PATENTS

| 2,868,847 | 1/1959 | Boyers | 260/635 |
|---|---|---|---|
| 3,137,639 | 6/1964 | Hurst et al. | 195/31 |
| 3,490,922 | 1/1970 | Hurst | 195/31 |
| 3,492,203 | 1/1970 | Mitsuhashi | 195/31 |
| 3,565,765 | 2/1971 | Heady et al. | 195/31 |
| 3,535,123 | 10/1970 | Heady | 195/31 |
| 2,004,135 | 6/1935 | Rothrock | 260/635 C |

OTHER PUBLICATIONS

Abdullah et al., Mechanism of Carbohydrase Action, Vol. 43, 1966.
Hou, E. F., Chem. Abs., Vol. 69, 1968, 53049d.
Kjolberg et al., Biochem. J. p. 258–262, Vol. 86, 1963.
Lee et al., Arch Biochem. Biophys., Vol. 116, p. 162–167, 1966.
Payur, J. H., Starch, Chem. and Tech., Vol. 1, p. 166, 1965.

*Primary Examiner*—A. Louis Monacell
*Assistant Examiner*—Gary M. Nath
*Attorney*—Browdy and Neimark

[57] ABSTRACT

A process for producing maltitol from a starch slurry which comprises hydrolyzing the starch slurry with beta-amylase and alpha-1,6-glucosidase to produce a high maltose containing product and catalytically hydrogenating the maltose with Raney nickel after adjusting the pH of the maltose product with calcium carbonate.

24 Claims, 1 Drawing Figure

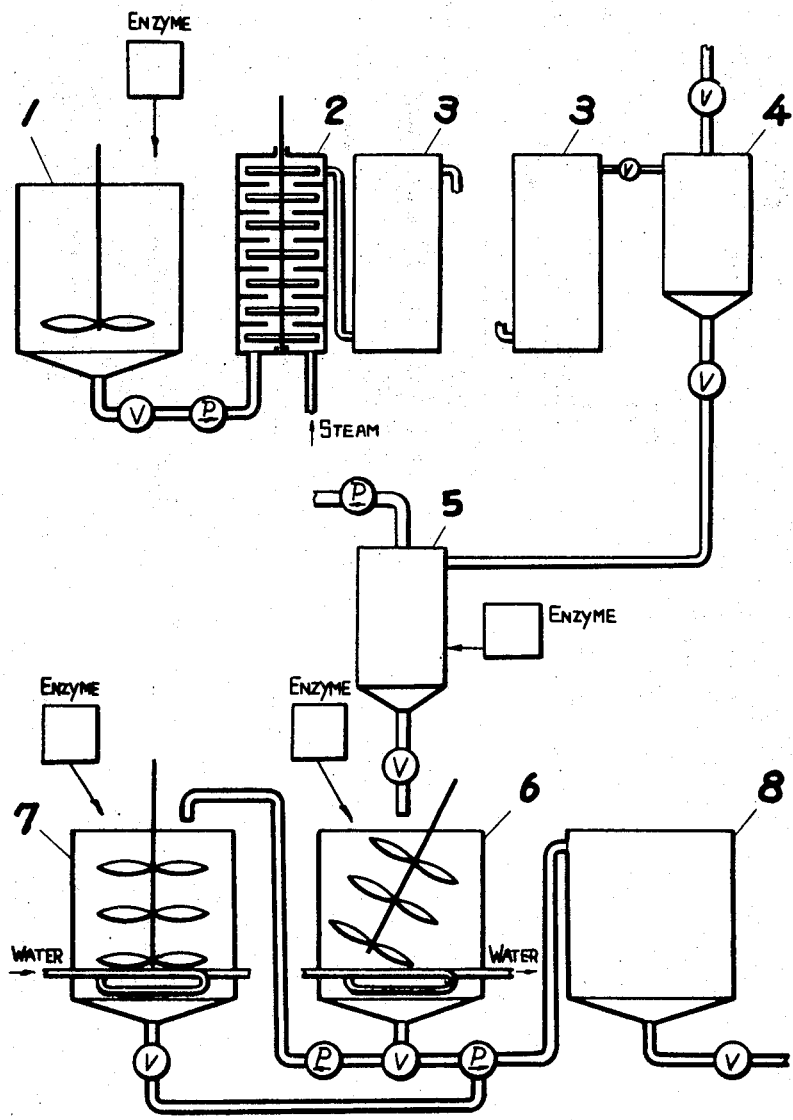

PROCESS FOR PRODUCING MALTITOL

DETAILED EXPLANATION OF THE INVENTION

This invention relates to a process for producing 4-($\alpha$-D-glucopyranosyl)-D-sorbitol, or maltitol, which is a high-pressure hydrogen reduction product from maltose.

Maltitol has heretofore been made by a know process which consists of removing dextrin as by alcohol fractionation from maltose having a purity of more than 60 percent that is obtained by decomposition of starch by malt amylase, repeating recrystallization of the dextrin-free maltose several times to attain a purity of about 90 percent, and then reducing the high-purity maltose by hydrogenation under high pressure. This conventional process is disadvantageous in that the means to attain the end are not adapted for commercial production with poor yield and high production cost.

The purpose of this invention is to eliminate these disadvantages and produce maltitol on an industrial scale at low cost.

Briefly stated, the present invention is directed to quantity production of maltitol on a commercial basis by decomposing branched structures of starches into amylosic straight-chain structures by the use of $\alpha$-1,6-glucosidases (isoamylase and pullulanase), the enzymes obtained, for example, by culturing strains of Aerobacter aerogenes and which have specific activities in cutting off the $\alpha$-1,6-glucoside bonds in starch amylopectin, thereby aiding the amylolytic activity of $\beta$-amylase to obtain maltose with a purity of nearly 100 percent, and thereafter reducing the maltose by hydrogenation under high pressure.

By way of illustration, in one experiment (A), a 10 percent sweet potato starch slurry was liquefied by $\alpha$-amylase to D.E. 2.7 percent, and 25 units of $\beta$-amylase was added per gram of the starch and then the mixture was saccharified at 55°C. for 16 hours, while, in another experiment (B), similar saccharification was carried out with the addition of 25 units of $\beta$-amylase and 10 units of $\alpha$-1,6-glucosidase per gram of starch. The compositions of the saccharified solutions that resulted were as tabled below. It was thus noted that when the $\beta$-amylase was used singly (A) the saccharified solution had a maltose content of 69.6 percent but when the $\beta$-amylase was used in combination with the $\alpha$-1,6-glucosidase (B) the maltose content of the resulting solution exceeded 90 percent.

| Saccharified solution | Composition Maltose | Glucose | Malttriose | Dextrin |
|---|---|---|---|---|
| A | 69.6% | 1.1% | 3.5% | 25.7% |
| B | 90.4% | 0.4% | 1.3% | 7.9% |

In hydrogenating maltose, the maltose was dissolved in water to prepare a 40 to 60 percent aqueous solution and Raney nickel ("N154," trademark of Nikki Kagaku's product) was used as a catalyst in an amount of 8 to 10 percent of the amount of the aqueous solution. Hydrogen was forced in the solution with a pressure of 20 to 100 kg/cm$^2$ while the temperature was gradually increased to 80° to 150°C., and thus hydrogenation was carried out. In such a case it sometimes occurs that the pH of the solution drops and the reaction slows down. If such is the case a decomposition of maltose will take place and the yield of maltitol is decreased to about 90 percent with the production of about 8 percent sorbitol. In the experiments, therefore, the pH of the solution was adjusted midway in an effort to improve the yield. However, the yield was only slightly increased to 93 percent. Then, calcium carbonate was added as a moderate neutralizing agent to the starting material maltose in an amount of 0.06 to 0.3 percent on the basis of the latter amount. This resulted in an increase of sorbitol production to 1.6 percent, thus indicating that the decomposition of maltose came to an end, and also an increase of maltitol yield to more than 96 percent. The result was satisfactory in both purity and yield.

Thus, in accordance with the process of the invention, 100 kg. of dehydrated starch in the form of a 3 percent aqueous solution was decomposed with heat, and the branched structure of dextrin was decomposed into a straight-chain structure by the addition of $\alpha$-1,6-glucosidase, and then saccharification was effected with $\beta$-amylase. The starch was thus completely decomposed into maltose, giving 103 kg. of maltose with a purity of 95 percent.

The maltose upon hydrogenation yielded 103.5 kg. of maltitol with a purity of 95 percent.

When the saccharification was effected without the addition of $\alpha$-1,6-glucosidase but solely with $\beta$-amylase, the maltose in the saccharified solution was decomposed leaving $\alpha$- and $\beta$-limit dextrins behind. Fractional estimation of various saccharides by paper chromatography showed that the product contained 50 percent maltose, 30 percent dextrin and 20 percent oligo-saccharide.

In this case, if this saccharified solution is hydrogenated, it affords 102 kg. of a reduction product which is a mixture of sugar alcohols of 50 percent maltitol, oligo-saccharide and dextrin. To obtain high-purity maltitol from this reduction product is difficult because of industrial problems involved.

In order to produce high-purity maltitol without the use of $\alpha$-1,6-glucosidase, maltose must be taken out of the saccharified solution by alcohol fractionation and must be recrystallized. When the procedure was repeated several times to obtain maltose with the same purity of 95 percent as by the process of the invention, only 3 kg. of 95 percent maltose was produced. The product upon hydrogenation yielded 3 kg. of 95 percent maltitol. Thus, the yield is too low, the production means are not adapted for commercial production, and the product is costly.

As described above, the present invention permits production of high-purity maltitol with good yield in commercial operation and hence provision of the product at cheap price, which has never been possible with the conventional process.

The process of producing maltose will now be more fully described hereunder. It has been known that maltose is manufactured from starches by liquefying a starch and saccharifying the liquid with the addition of malt (i.e., a mixture of $\alpha$- and $\beta$-amylases). According to this known process, the maltose contents of the saccharified products are at most 50 to 60 percent. The products usually contain large percentages of proteins and limit dextrins. Thus, because of the low maltose contents and high impurity contents, the products involve great difficulties in being purified merely by simple recrystallization procedures.

The factor which makes it impossible to effect complete amylolysis of a starch into maltose in accordance with the conventional process is the production of limit dextrins including α-1,6-glucoside bonds. The present invention has been perfected with this in view. More particularly, the present invention is directed to the manufacture of highly pure maltose at high yields from starches by selectively decomposing the α-1,6-glucoside bonds contained in amylopectin, a constituent of starch, that is, the α-1,6-glucoside bonds that form the branches of amylopectin having a branched molecular structure, by taking advantage of the specificity of α-1,6-glucosidase, thereby converting the amylopectin to molecules of amylose type consisting solely of straight-chain α-1,4-glucoside bonds which facilitate the activity of β-amylase.

Since β-amylase is an enzyme capable of selectively decomposing the α-1,4-glucoside bonds which are major bonds for the straight chain of starch molecules, it can completely decompose the amylose composed entirely of straight-chain α-1,4-glucoside bonds of starch molecules. For amylopectin, however, it is noted that, while its branched molecular structure whose branches are formed by α-1,4glucoside bonds is decomposable by β-amylase, the α-1,6-glucoside bonds that constitute the branches inhibit the decomposition by β-amylase and stop the reaction. This is what is known as the limit dextrin. The present invention is characterized in that, in subjecting a starch solution to the action of β-amylase, the α-1,6-glucoside bonds that have the inhibitory action are selectively decomposed by the addition of an α-1,6-glucosidase during or before the reaction so as to permit uninterrupted action of the β-amylase.

The α-1,6-glucosidases for use in this invention are those derived from yeasts and plant sources and reported as isoamylase or R-enzyme, but they have too poor activities for practical use. Pullulanase (Biochem Z, *334*,79 (1961)) extracted by Bender et al. in 1961 exhibits a slightly greater activity and has been utilized in determining the constitutions of starches, but the report covers only its actions and effects upon very thinly diluted solutions of one percent or less starches. No useful findings as regards its industrial applications have ever been reported. The present inventors, with the industrial possibilities of α-1,6-glucosidases in mind, extensively collected samples of type cultures and soil bacteria in many different locations and, after repeated screening operations, found several varieties of bacteria capable of yielding highly active enzymes out of the strains of the genera Escherichia, Pseudomonas, Lactobacillus, Micrococcus, Nocardia, etc. Of the bacteria chosen by screening, those of the genera Pseudomonas, and Lactobacillus were adopted for the present invention. The enzymes thereby produced are somewhat different from one another in the substrate specificity and enzymatic properties. The advisability of using these enzymes either singly or in mixture was studied, and it has now been found that the combined use of pullulanase with the enzyme produced by a strain of the genus Pseudomonas gives a good result.

Starches commonly available, including corn starch, potato starch, sweet potato starch and waxy corn starch, may be used in the practice of the present invention. Dissolution of starch is accomplished by heating the starch slurry at 80° to 180° C., or by adding α-amylase and liquefying the mixture with the application of heat ranging from 70° to 95° C, or weakly acidifying the slurry and then liquefying the starch with heat. In any case, the liquefaction or thermal dissolution of starch decomposes the starch molecules into finer ones and therefore, even when the starch has been completely amylolyzed by β-amylase, the molecules formed of an even number of glucose units are decomposed into maltose molecules of two glucose units each, and thus leave maltotriose or glucose per molecule of the liquefied starch. Because the finer the molecules of the starch upon amylolysis the smaller the maltose content of the perfectly amylolyzed starch, a lower D.E. is preferred for the starch upon dissolution.

On the other hand, the reactions of β-amylase and α-1,6-glucosidase conveniently proceed with the progress of the amylolysis and thinning of the starch solution. This means that amylolysis of starch must be discontinued at the minimum point where the saccharification can take place. In this sense the D.E. of starch at the time of dissolution should be not higher than five, preferably about one to two. When the starch slurry is to be liquefied with heat in the absence of any liquefying enzyme, it should be continuously heated at or below 180°C. by agitation-liquefying method and the holding time should be so adjusted as to give a D.E. of about one to two. For the same reason, where a liquefying enzyme is employed, the starch must be continuously liquefied at a temperature between 70° and 95°C. taking the deactivation of the enzyme with heat into consideration and the holding time must be limited within several minutes in consideration of the D.E. In the liquefaction using an acid, the D.E. tends to rise excessively. In this case the starch can be liquefied by heating at above 100°C with the pH adjusted to a value between three and five.

A starch solution thus obtained by any of the methods above described has a very high viscosity and, with a starch concentration between 20 and 30 percent which is particularly beneficial for commercial production, the solution becomes jelly-like upon cooling and the consequent retrogradation of the amylose molecules inhibits the reaction of the saccharifying enzyme. Even a solution which does not undergo the retrogradation should not be used with a starch concentration of as high as 30 percent or more because the action of β-amylase appears to be inhibitory to the substrate. Accordingly, a solution having a starch concentration ranging from 10 to 20 percent is suitable for subsequent treatments.

As noted above, liquefied starch easily undergoes retrogradation and it is therefore essential to treat it quickly before the viscosity is decreased by the amylolysis due to the addition of a saccharifying enzyme (β-amylase) and α-1,6-glucosidase, and keep it at as high a temperature as feasible. Thus, a gelatinized starch solution must be continuously and instantaneously cooled by a flash cooler followed immediately by the addition of enzyme. It is advisable for this purpose to add initially a portion of β-amylase or an enzyme of relatively high heat resistance yielded by a strain of the genus Lactobacillus (e.g., Lactobacillus gayomii (ATCC 8289) or Lactobacillus plantarum (ATCC 8008)) at a relatively high temperature of between 45° and 70°, and then, with the drop of the viscosity, add the rest of the enzyme. Also, as a practical method of starch saccharification, it is important, depending upon the properties of the enzymes to be used, to carry out the primary preconversion for a period of 20 to 60 minutes so that enzymes of different kinds can be mixed together and then cool the solution to 45° to 60°C. and, after the rest of the enzymes has been added and mixed, transfer the mixture into a saccharifying tank. Because the viscosity is still high in this stage, the secondary presaccharification is run preferably with a holding time of about one to about 4 hours. Then, the saccharification will proceed to a considerable extent and the viscosity will drop, thus permitting a highly viscous solution to be poured together with oxygen into a large amount of a less viscous solution. Consequently, retrogradation is avoided and the solution is kept at a suitable temperature by the cooler in the presaccharifying tank. The mixing of the enzymes and the saccharification are thus adequately carried out and the viscosity of the solution is decreased while avoiding any retrogradation, and then the solution is pumped up to the saccharifying tank for saccharification in batch operation. Since the saccharification takes two to three days, the solution is kept at a suitable temperature between 45° and 55°C. and the pH is adjusted with the enzymes to a value between 4.5 and 6.0. In this way the saccharification can be concluded.

The solution thus prepared with considerations given as described above is a converted sirup having a net maltose content of 92 to 94 percent and also containing glucose, maltotriose, etc. in a combined amount of about 5 percent. It is then filtered and purified with ease and, after the subsequent treatments in the usual manner, it gives a colorless, clear sugar solution.

In some cases a very small amount of high-molecular dextrin left behind may render the filtration and purification difficult. This is attributable to the effort to limit the liquefaction of starch to an extremely low level and obtain an accordingly increased maltose content. If such is the case, therefore, the filtration can be facilitated by adding a small amount of $\alpha$-amylase in the course of saccharification thereby decomposing the dextrin.

In the experiment, the pure maltose thus obtained was transferred into an autoclave and was hydrogenated under pressure in the presence of a catalyst, when pure maltitol resulted.

Investigations on the properties of this maltitol for use as a sweetening agent have led to the following findings:

1. Sweetness

A panel test on sweet taste showed that the sweetness of this substance is round and moderate. It goes off quickly and leaves no thick after-taste.

It is sweeter than grape sugar but is less sweet than cane sugar, with sweetness apparently about 75 percent that of the latter.

The panel test, participated in by 30 examiners, gave results as below:

A. Significant difference

The significant difference was determined by a paired preference test on the following basis:

1. Equation $$x^2 = [(\alpha_1 - \alpha_2) - 0.5]/N$$

where
- $x^2$ : Individual panel result
- $\alpha_1$ : Number of right answers
- $\alpha_2$ : Number of wrong answers
- $N$ : $\alpha_1 + \alpha_2$ 2. Table of $x^2$'s (No. of deg. of freedom = 1)

| Level of significance | 20% | 10% | 5% | 1% | 0.1% |
|---|---|---|---|---|---|
| $x^2$ | 1.642 | 2.706 | 3.841 | 6.635 | 10.827 |

3. Considering the significant difference with level of significance at 5percent or 1percent, then it was found:
   - $x^2 > 6.635$     1%, Yes
   - $6.63 > x^2 > 3.84$     5%, Yes
   - $x^2 > 3.84$     No B. Test results 1. Sweetness tests on D-glucose, D-fructose, sucrose and maltitol The above test was repeated at least five times for each of the test sweetenings.

| Concentration | Sugars as compared with maltitol | | |
|---|---|---|---|
| | D-Fructose | D-Glucose | Sucrose |
| 70% | 42.78 | 6.02 | 28.46 |
| 35% | 17.86 | 3.13 | 15.86 |
| 20% | 28.14 | 1.59 | 12.57 |
| 10% | 20.16 | 0.083 | 8.37 |

From the results tabled above, the sweetening materials may be ranked by order of sweetness as D-fructose > sucrose > maltitol > D-glucose 2. Sweetness of maltitol as compared with that of sucrose To eliminate the factor of viscosity, maltitol was dissolved in water to prepare a 35 percent aqueous solution and the solution was compared with aqueous solutions of sucrose at different concentrations. The results were as tabled below:

| Sucrose concentration | $x^2$ |
|---|---|
| 5 % | 21.01 |
| 10 | 21.01 |
| 15 | 21.01 |
| 18 | 17.28 |
| 20 | 8.63 |
| 25 | 3.67 |
| 30 | 2.83 |

From the results it appears that a 35 percent aqueous solution of maltitol is as sweet as a 25 percent aqueous solution of sucrose.

2. Non-crystallinity

Maltitol is 100 percent soluble freely in water. Even a highly concentrated aqueous solution containing 80 percent maltitol, for example, will not form crystals but occur in the form of a viscid liquid.

In addition, maltitol is useful in preventing crystallization of other sugars. For example, sucrose or dextrose mixed with maltitol will not crystallize.

3. Non-caloric value

Experiments revealed that, whereas maltose is readily decomposed by various enzymes, maltitol remains almost unaffected, losing only a few percent. The degrees of decomposition of maltitol as compared with those of maltose were determined using a saccharogenic amylase obtained from a strain of the genera Rhizopus, an enzyme extracted from the pancreas of a hog, and an enzyme obtained by salting out an autolyzed yeast extract solution. The particulars of the experiments were as follows:

1. Enzymes used and their activities
   A. Rhizopus saccharogenic amylase (prepd. by Amano Seiyaku Co.):
      (1) MA: 8 u/ml (SA: 120 u/ml)
      (2) MA: 0.8 u/ml (SA: 12 u/ml)
   B. Enzyme extracted from hog pancreas:
      MA: 0.17 u/ml
   C. Salted out enzyme of autolyzed yeast extract solution:
      MA: 0.07 u/ml 2. Conditions for enzymatic actions
   A. Composition of reactant solution for the Rhizopus saccharogenic amylase:

| | |
   |---|---|
   | 1% maltitol or maltose solution | 5 ml |
   | M/10, pH 5.0 acetic acid buffer solution | 4 ml |
   | Enzymatic solution | 1 ml |
   | Reaction temperature — 40° C. | |

B. Composition of reactant solution for the hog pancreas extract enzyme:

| | |
   |---|---|
   | 1. maltitol or maltose solution | 5 ml |
   | M/10, pH 7.5 phosphoric acid buffer solution | 4 ml |
   | Enzymatic solution | 1 ml |
   | Reaction temperature — 40° C. | |

C. Composition of reactant solution for the salted out enzyme of autolyzed yeast extract solution:

| | |
   |---|---|
   | 1% maltitol or maltose solution | 5 ml |
   | M/10, pH 6.5 acetic acid buffer solution | 4 ml |
   | Enzymatic solution | 1 ml |
   | Reaction temperature — 35° C. | |

3. Determination of the rates of decomposition

The reducing power of each reactant solution with time was determined in terms of glucose by the Lehmann-Shawl method and the values thus obtained were regarded as those of direct saccharification with time. Aside from this 1 milliliter of a 25 percent hydrochloric acid solution was added to each reactant solution, and the mixture was hydrolyzed by the usual method in boiling water for 1 hour, and then the reducing power was again determined in the same manner as above. The values were regarded as those of total saccharification.

Decomposition rate =

$$\frac{\text{Direct saccharification value with time} - \text{Direct saccharification value in zero hour}}{\text{Total saccharification value} - \text{Direct saccharification value in zero hour}} \times 100 \text{ (percent)}$$

4. Results

A. Decomposition by Rhizopus saccharogenic amylase:

| | ma: 8 u/ml enzyme soln. | | ma: 0.8 u/ml enzyme soln. | |
|---|---|---|---|---|
| Reaction time | Decomp. rate of maltitol (%) | Decomp. rate of maltose (%) | Decomp. rate of maltitol (%) | Decomp. rate of maltose (%) |
| 15 min. | — | 93.5 | — | 24.2 |
| 30 min. | 5.1 | 96.8 | — | 48.2 |
| 1 hr. | 5.6 | 96.8 | 1.4 | 58.3 |
| 3 hrs. | 6.0 | 97.6 | 1.9 | 91.4 |
| 5 hrs. | 6.0 | 100.0 | 2.3 | 99.4 |

B. Decomposition by hog pancreas extract enzyme:

| Reaction time (hr.) | Decomp. rate of maltitol (%) | Decomp. rate of maltose (%) |
|---|---|---|
| 1 | — | 16.7 |
| 2 | 6.7 | 27.4 |
| 20 | 8.5 | 82.1 |
| 45 | 9.05 | 94.0 |
| 120 | 9.96 | 98.5 |

C. Decomposition by salted out enzyme of autolyzed yeast solution

| Reaction time (hr.) | Decomp. rate of maltitol (%) | Decomp. rate of maltose (%) |
|---|---|---|
| 1 | 0.9 | 12.8 |
| 2 | 1.7 | 24.7 |
| 3 | 3.8 | 32.0 |
| 4 | 5.5 | 39.8 |
| 5 | 8.5 | 45.1 |
| 7 | 12.4 | 67.0 |

Maltitol has no caloric value because it is not digested or absorbed by digestive organs of the higher animal.

4 This was demonstrated by experiments with live rabbits. The intestines of test rabbits not fed for 24 hours beforehand were closed at both ends and were injected with 50 cc. of a 20 percent aqueous solution of maltitol or an equimolecular amount of a sucrose solution each. After the lapse of several hours, the sugars or sugar alcohols left in the intestines were estimated. It was then found that, while 90 percent of the sucrose intake had been lost due to absorption and digestion, maltitol had show no loss, thus proving its impossibility of being absorbed and digested in the digestive organs. It was also found that maltitol has no harmful stimulus because the intestinal walls exposed to it showed no irregularity such as congestion.

Recent reports have disclosed that xylose and sorbitol, both known as non-caloric sweetening materials, are actually metabolized and cannot be as non-caloric as maltitol.

Thus, maltitol has no energy value as food and, in addition, can improve the palatability of foods with sweetness and body. For these reasons it is essential for the preparation of non-caloric drinks and edibles.

4. Moisture retention and viscosity

The remarkable moisture-retaining property and viscosity of maltitol are naturally expected from its chemical structure. With these features the additive can also serve as a stabilizer for flavorings, colorants, etc.

Maltitol is highly viscous, as exemplified by the viscosity values of a 70 percent solution of it at different temperatures as follows:

| At | 22°C | 274 | cps. |
|---|---|---|---|
|  | 30 | 167 |  |
|  | 40 | 94.5 |  |
|  | 50 | 60 |  |
|  | 59 | 40.3 |  |

5. Thermal stability

Maltitol is highly stabilized against heat. When heated with direct fire, it undergoes no coloration at all up to 200°C. and is colored only slightly above 200° C. Also it will not solidify fast on cooling.

As described hereinabove, maltitol has adequately beneficial properties as a source of sweetness to foods and drinks and, moreover, it obviously has dietetic advantages because of the lack of caloric value. Maltitol is therefore useful for the preparation of various soft drinks, including aerated waters such as "Colas" and "Ciders", lactic acid drinks such as "Calpis", and artificial fruit juices, especially concentrated ones. Substitution of maltitol for starch sirup, dextrose or sucrose in ordinary sweet drinks causes replacement of the total amount of carbohydrates in the solid contents of the drinks by the low-caloric substance. This is not only valuable from medical and dietetic viewpoints but is desirable for improving the palatability, imparting suitable viscosity and maintaining flavors of the drinks. By virtue of the additive the drinks can retain their delicious flavors, suit to all palates, and leave no unpleasant after taste behind.

Similarly, maltitose used in sponge cakes and candies, Western or Japanese, gives non-sugar cakes and candies with minimized caloric values. In addition, it causes no danger of drying or crystallization as is often the case with sucrose, and thus it fully displays its advantageous properties of moisture retention and non-crystallization. Biscuits and other baked candies sweetened with maltitol can be served as non-sugar, low-calory diets. Moreover, the good thermal stability of maltitol avoids excessive coloration of the candies with heat, and protectsthe candies from cracking and deformation due to cooling after the baking. It is also helpful in improving the yields, preventing loss of the taste and maintaining the food quality for lengthy periods of time. When used in the preparation of jellies and the like, maltitol as a non-caloric ingredient can again prove valuable, for example, in avoiding undesired coloration and fading of edible dyes, in imparting a moisture-retaining property, in maintaining the flavor, and in ensuring long shelf life.

The present invention is illustrated by the following non-limitative examples.

1. Preparation of maltose

A continuous reaction equipment as schematically illustrated in FIG. 1 was employed. A starch slurry feed tank is generally indicated at 1, where the concentration and pH of the slurry and the amount of liquefying enzyme to be added are adjusted. The starch slurry is pumped from this tank into a starch liquefier 2, which is equipped with a multi-blade agitator. The starch slurry is there heated to a constant temperature with live steam while being vigorously stirred, until it is uniformly gelatinized. Several retention or holding tanks 3 are provided to liquefy the starch to the optimum D.E. value while holding it at a constant temperature with the aid of jackets. The liquefied starch flashed through a reducing valve into a flash cooler 4 at a normal pressure and cooled to about 100°C. is immediately injected into a vacuum flash cooler 5 and is cooled to a predetermined temperature. The cooled liquid is pumped out of the cooler and is led into a first mixing tank 6. The enzyme is continuously introduced into the liquid either from the bottom of the cooler 5 or directly into the mixing tank 6.

When the total amount of enzyme is to be added at one time, the mixed saccharified solution is drained from the bottom of the tank 6 and is held in a saccharifying tank 8 where the saccharification is concluded. When the enzyme is to be added in two portions, the liquid is retained in the tank 6 for a predetermined period of time and then is continuously drained from the bottom into a mixing holding boiler 7, while the second portion of enzyme is continuously poured in. After a certain period of holding, the solution is sent to the saccharifying tank 8. The mixing with enzyme and temperature control in the vessels 6 and 7 are conducted with powerful agitators and heat exchangers provided therein.

The operation of the equipment above described was performed in such way that initially water was flown at a predetermined flow rate and the temperatures of the component units were adjusted to given values by automatic temperature controllers, the enzyme was added, and thereafter the water was replaced by a starch slurry and saccharification was carried out.

The enzymes used for the experiments were commercially available varieties of bacterial $\alpha$-amylase as the liquefying enzyme (C) and an enzyme extracted from wheat (disclosed in the U.S. Application Ser. No. 562,528) as $\beta$-amylase. As the $\alpha$-1,6-glucosidase (debranching enzyme), three enzymes were adopted, i.e., pullulanase (P) produced by Aerobacter aerogenes (Biochem. Z, *334*, 79 (1961)), an enzyme enzyme (I) produced by Pseudomonas amyloderamosa (U.S. Application Ser. No. 73,326, ATCC 21262), and an enzyme (L) produced by Lactobacillus plantarum (Japanese Pat. Application No. 21364 (7/1967), ATCC 8008).

The activity of each enzyme used was determined in the following way. In the case of $\alpha$-amylase, a mixed solution consisting of one gram of potato starch on solid basis, 1 ml. of an M/10 acetic acid buffer solution and 8 ml. of water was introduced in several test tubes each having an inside diameter of 18 mm, and solutions of the enzyme in different concentrations were introduced in 1-milliliter portions into the respective test tubes. The tubes were heated with vigorous shaking in boiling water, and, after the gelatinization of the starch, kept at 65°C. for 15 minutes, and then placed again in boiling water for 10 minutes, thereby to deactivate the enzyme. After cooling in water at 17°C. for 3 minutes, 1 milliliter each of 0.1 percent fuchsine solution was added to the tubes and the tubes were tumbled twice with the mouths stoppered. Of the solutions thus evenly colored without clouding, the enzyme solution of the lowest concentration was picked up and its activity was regarded as one unit.

The activity of β-amylase was determined as follows. 5 ml. of a 1 percent soluble starch solution, 4 ml. of an M/10 acetic acid buffer solution and 1 ml. of the enzyme solution at a different concentration were mixed and reacted at 40°C. for 30 min. The reducing sugar thereby produced was estimated in terms of maltose, and the activity of the enzyme solution which gave 10 mg. of maltose when determined in this way was regarded as one unit.

The activity of α-1,6-glucosidase was determined in the following manner. One milliliter of an enzyme solution, 5 ml. of 1 percent soluble glutinous-rice starch solution, and 1 ml. of a 0.5N acetic acid buffer solution (pH 6.0) were mixed and a reaction was effected at 40°C. for 30 minutes. Half a milliliter of the reactant solution was poured into a mixed solution consisting of 0.5 ml. of a 0.01N iodine-potassium iodide solution and 15 ml. of 0.01N sulfuric acid. Thereupon the mixture immediately turned bluish purple in color. After the lapse of 15 minutes, the extinction coefficient of the color was measured with a light having a wavelength of 620 mμ, and the difference between the measured value and that obtained immediately after the reaction was calculated. The activity of an enzyme solution which gave the balance of 0.01 was regarded as a unit.

After the saccharification, the sugar solution was heated and the enzyme was deactivated. The solution with pH 6 by heating at 160° to 165°C. Ex. VI was conducted with the addition of oxalic acid in an amount equivalent to 0.05 percent of the amount of starch and heating the mixture at 120°C. for a short period of time. The D.E. was invariably adjusted within the range of 0.5 to 2.

Where presaccharification was performed with the addition of an α-1,6-glucosidase and β-amylase in two different stages, a temperature of 45° to 60°C. and a heat-resisting α-1,6-glucosidase (L) were used for the first stage of presaccharification. In order to decrease the viscosity of the starch as rapidly as possible, the enzyme was continuously poured in the vacuum flash cooler 5. The second stage of presaccharification, as well as the one-step presaccharification, was effected by treating the charge with a temperature of 45° to 60°C. and a pH of 6, mixing it rapidly with agitation by a powerful agitator. The average holding time for the primary presaccharification where the presaccharification was conducted in two stages ranged from 20 to 60 minutes. Otherwise the durations were in the range of 180 to 240 minutes. In each experiment the reaction product was introduced into the main saccharifying tank, and the saccharification was concluded in batch operations. The temperature was adjusted to 45°C., and the pH was adjusted to 5.5 when the enzyme (I) was employed and to 6.0 in other instances. The holding time for the main saccharification was 2 to 3 days.

While the sugar yield immediately after the saccharification was 98 percent, the final yield as crystalline product was reduced to 95 percent due to the purification loss. The maltose contents of the experimental products were in the range of 92 to 95 percent. Some examples are given in Table 1.

TABLE 1

| Example Number | I | II | III | IV | V | VI | VII |
|---|---|---|---|---|---|---|---|
| Kind of starch | (1) | (1) | (1) | (2) | (2) | (2) | (1) |
| Concentration of starch, percent | 30 | 30 | 25 | 25 | 25 | 25 | 10 |
| Temp. of liquefaction, °C | 90~92 | 90~92 | 90~92 | 165 | 165 | 120 | 120 |
| Liquefying enzyme | (3) | (3) | (3) | | | (4) | |
| D.E. of liquefied starch | 1.8 | 1.5 | 1.5 | 0.9 | 0.8 | 2 | 0.5 |
| 1st preconverter: | | | | | | | |
| Enzyme: | | | | | | | |
| Unit | β 50 | β 50 | L 40 | β 70 | β 50 / I 30 / P 30 | β 50 / L 40 | β 50 / L 50 |
| G. starch | P 50 | | | | | | |
| pH | 6.0 | 6.0 | 6.0 | 6.0 | 5.5 | 6.0 | |
| Temp., °C | 45~50 | 70 | 60 | 65 | 45~50 | 45~50 | 45~50 |
| 2nd preconverter: | | | | | | | |
| Enzyme | | P 40 | β 40 | I 50 | | | |
| pH | | 6.0 | 6.0 | 5.5 | | | |
| Temp | | 45~50 | 45~50 | 45~50 | | | |
| Hold time (hrs.) | 48 | 50 | 48 | 40 | 50 | | 50 |
| Maltose contents | 93~92 | 93 | 93~94 | 90~93 | 91~93 | 90 | 87 |

[1] Sweet potato starch.  [2] Corn starch.  [3] α-Amylase.  [4] Oxalic acid.

was then decolored and desalted by decoloring filtration with active carbon and purification with an ion exchange resin. It was concentrated and the dry yield was determined. The saccharide composition was fractionally determined and estimated by paper chromatography.

The starches used as the starting materials were sweet potato starch for Ex. I to III and corn starch for Ex. IV to VI. The sweet potato starch was continuously liquefied at 90°C. with the addition of α-amylase at a rate of 10 units per gram of the starch. With a holding time of about 1 to 2 minutes, the liquid was decomposed to a D.E. of about one to two percent. Next, the temperature was increased to 120°C. to deactivate the enzyme. Liquefaction of the corn starch was effected 2. Hydrogenation of maltose
  1. Maltose as starting material:
    The composition of the maltose used was 96.6 percent maltose, 0.4 percent dextrose, and 3.0 percent malt-triose. This decolored and purified maltose was used in the form of a 40 to 60 percent aqueous solution.
  2. Reduction catalyst:
    Raney nickel ("N154", trademark of Nikki Kagaku's product) was used as developed in alkali in an amount equivalent to 8 to 10 percent of the amount of the starting material.
  3. Reaction conditions:
    a. The temperature was between 90° and 100°C, at which two-thirds equivalent of hydrogen was absorbed. Finally the temperature was increased to 125°C. to reach the equilibrium point of absorption.

b. The pressure used ranged from 20 to 100 kg/cm².
c. Calcium carbonate was added in an amount of 0.3 to 0.05 percent of the amount of the starting material.

Under these conditions, the reaction was carried out with stirring. The compositions of the reaction products obtained with or without the addition of calcium carbonate were as tabled below. On completion of the reaction, the catalyst Raney nickel was removed and each product was concentrated, decolored and purified through ion exchange in the usual manner.

|  | Without $CaCO_3$ | | With $CaCO_3$ (% per maltose) | | |
| --- | --- | --- | --- | --- | --- |
|  | pH adjusted | pH not adjusted | 0.06% | 0.13% | 0.25% |
| pH at the start of the reaction | 4.0 – 6.2 | 7.0 – 7.5 | 7.3 | 7.4 | 7.0 |
| pH at the end of the reaction | 4.2 – 3.7 | 4.3 – 3.8 | 4.8 | 5.7 | 6.1 |
| Unreacted direct sugar/material(%) | 0.4 – 1.8 | 6.2 – 1.2 | 0.63 | 0.28 | 0.25 |
| Reaction time (hr.) | 8 – 13 | 8 – 10 | 8 | 8 | 8 |
| Composition: (%) |  |  |  |  |  |
| Sorbitol | 7.3 | 4.6 | 2.1 | 1.8 | 1.6 |
| Maltitol | 90.8 | 93.5 | 95.9 | 96.2 | 96.4 |
| Others | 1.9 | 1.9 | 2.0 | 2.0 | 2.0 |

We claim:

1. A process for producing maltitol which comprises the steps of (1) completely gelatinizing and dissolving a starch slurry by heating it at a temperature ranging from 80° to 180°C., (2) cooling the starch solution to a temperature between 45° and 60°C. and adding α-1,6-glucosidase thereto and mixing them together uniformly with stirring thereby promoting the reaction and decreasing the viscosity, (3) adding β-amylase to the reaction mixture and thoroughly mixing them together with stirring and then holding the mixture until the reaction is concluded, and (4) thereafter purifying the maltose produced by the step (3) above, adjusting the pH of the purified maltose by adding $CaCO_3$ thereto in an amount of 0.05 – 0.6 percent by weight per weight of maltose, and catalytically hydrogenating the purified maltose with the use of Raney nickel catalyst at a temperature of 80° to 150° C. and a pressure of 20 to 100 kg/cm².

2. A process according to claim 1 wherein the step (1) is to adjust the pH of the starch slurry to a value between 3 and 5 then completely gelatinize and dissolve it by heating at above 100°C.

3. A process according to claim 1 wherein the α-1,6-glucosidase to be added in the step (2) is a mixture of two or more varieties of different behaviors.

4. A process for producing maltitol which comprises the steps of (1) completely liquefying and dissolving a starch slurry by adding α-amylase to it at a temperature ranging from 70° to 95°C., (2) cooling the starch solution to a temperature between 45° and 60° and adding α-1,6-glucosidase thereto and mixing them together uniformly with stirring thereby promoting the reaction and decreasing the viscosity, (3) adding β-amylase to the reaction mixture and thoroughly mixing them together with stirring and then holding the mixture until the reaction is concluded, and (4) thereafter purifying the maltose produced by the step (3) above, adjusting the pH of the purified maltose by adding $CaCO_3$ thereto in an amount of 0.05 – 0.6 percent by weight per weight of maltose, and catalytically hydrogenating the purified maltose with the use of Raney nickel catalyst at a temperature of 80° to 150°C. and a pressure of 20 to 100 kg/cm².

5. A process according to claim 4 wherein the α-1,6-glucosidase to be added in the step (2) is a mixture of two or more varieties of different behaviors.

6. A process for producing maltitol which comprises the steps of (1) completely gelatinizing and dissolving a starch slurry by heating it at a temperature ranging from 80° to 180°C. (2) cooling the starch solution to a temperature between 45° and 60°C. and adding α-1,6-glucosidase and β-amylase thereto with rapid stirring to effect the reaction, (3) holding the reaction mixture at between 45° and 55°C. until β-amylolysis is concluded, and (4) thereafter adjusting the pH of the purified maltose by adding $CaCO_3$ thereto in an amount of 0.05 – 0.6 percent by weight per weight of maltose, and carrying out catalytic hydrogenation of the resulting saccharified solution with the use of Raney nickel catalyst at a temperature of 80° to 150°C. and a pressure of 20 to 100 kg/cm².

7. A process according to claim 6 wherein the step (1) is to adjust the pH of the starch slurry to a value between 3 and 5 then completely gelatinize and dissolve it by heating at above 100°C.

8. A process according to claim 6 wherein the α-1,6-glucosidase to be added in the step (2) is a mixture of two or more varieties of different behaviors.

9. A process for producing maltitol which comprises the steps of (1) completely liquefying and dissolving a starch slurry by adding α-amylase to it at a temperature ranging from 70° to 95°C., (2) cooling the starch solution to a temperature between 45° and 60°C. and adding α-1,6-glucosidase and β-amylase thereto with rapid stirring to effect the reaction, (3) holding the reaction mixture at between 45° and 55°C. until β-amylolysis is concluded, and (4) thereafter adjusting the pH of the purified maltose by adding $CaCO_3$ thereto in an amount of 0.05 – 0.6 percent by weight per weight of maltose, and carrying out catalytic hydrogenation of the resulting saccharified solution with the use of Raney nickel catalyst at a temperature of 80° to 150°C. and a pressure of 20 to 100 kg/cm².

10. A process according to claim 9 wherein the α-1,6-glucosidase to be added in the step (2) is a mixture of two or more varieties of different behaviors.

11. A process for producing maltitol which comprises the steps of (1) completely gelatinizing and dissolving a starch slurry by heating it at a temperature ranging from 80° to 180°C., (2) cooling the starch solution to a temperature between 45° and 70°C. and adding β-amylase with rapid stirring to decrease the viscosity of the starch solution, (3) adding α-1,6-glucosidase to the reaction solution and further effecting the reaction at a temperature between 45° and 60°C. until β-amylolysis is concluded, and (4) thereafter adjusting the pH of the purified maltose by adding $CaCO_3$ thereto in an amount of 0.05 – 0.06 percent by weight per weight of maltose, and catalytically reducing the saccharified solution thus produced with the addition of Raney nickel catalyst and by the introduction of hydrogen gas at a temperature of 80° to 150°C. and a pressure of 20 to 100 kg/cm².

12. A process according to claim 11 wherein the step (1) is to adjust the pH of the starch slurry to a value between 3 and 5 then completely gelatinize and dissolve it by heating at above 100°C.

13. A process according to claim 11 wherein the α-1,6-glucosidase to be added in the step (3) is a mixture of two or more varieties of different behaviors.

14. A process for producing maltitol which comprises the steps of (1) completely liquefying and dissolving a starch slurry by adding α-amylase to it at a temperature ranging from 70° to 95°C. (2) cooling the starch solution to a temperature between 45° and 70°C. and adding β-amylase with rapid stirring to decrease the viscosity of the starch solution, (3) adding α-1,6-glucosidase to the reaction solution and further effecting the reaction at a temperature between 45° and 60°C. until β-amylolysis is concluded, and (4) thereafter adjusting the pH of the purified maltose by adding $CaCO_3$ thereto in an amount of 0.05 – 0.6 percent by weight per weight of maltose, and catalytically reducing the saccharified solution thus produced with the addition of Raney nickel catalyst and by the introduction of hydrogen gas at a temperature of 80° to 150°C. and a pressure of 20 to 100 kg/cm².

15. A process according to claim 14 wherein the α-1,6-glucosidase to be added in the step (3) is a mixture of two or more varieties of different behaviors.

16. A process for producing maltitol which comprises the steps of (1) completely gelatinizing and dissolving a starch slurry by heating it at a temperature ranging from 80° to 180°C., (2) cooling the starch solution and completely liquefying it by adding α-amylase at a temperature ranging from 70° to 95°C., (3) adding α-1,6-glucosidase thereto and mixing them together uniformly with rapid stirring thereby promoting the reaction and decreasing the viscosity, (4) adding β-amylase to the reaction mixture and thoroughly mixing them together with stirring and then holding the mixture until the reaction is concluded, and (5) thereafter adjusting the pH of the purified maltose by adding $CaCO_3$ thereto in an amount of 0.05 – 0.6 percent by weight per weight of maltose, and purifying the maltose produced by the step (4) above and catalytically hydrogenating the purified maltose with the use of Raney nickel catalyst at a temperature of 80° to 150°C. and a pressure of 20 to 100 kg/cm².

17. A process according to claim 16 wherein the step (1) is to adjust the pH of the starch slurry to a value between 3 and 5 then completely gelatinize and dissolve it by heating it above 100°C.

18. A process according to claim 16 wherein α-1,6-glucosidase to be added in the step (3) is a mixture of two or more varieties of different behaviors.

19. A process for producing maltitol which comprises the steps of (1) completely gelatinizing and dissolving a starch slurry by heating it at a temperature ranging from 80° to 180°C., (2) cooling the starch solution and completely liquefying it by adding α-amylase at a temperature ranging from 70° to 95°C., (3) adding α-1,6-glucosidase and β-amylase thereto with rapid stirring to effect the reaction, (4) holding the reaction mixture at between 45° and 55°C. until β-amylolysis is concluded, and (5) thereafter adjusting the pH of the purified maltose by adding $CaCO_3$ thereto in an amount of 0.05 – 0.6 percent by weight per weight of maltose, and carrying out catalytic hydrogenation of the resulting saccharified solution with the use of Raney nickel catalyst at a temperature of 80° to 180°C. and a pressure of 20 to 100 kg/cm².

20. A process according to claim 19 wherein the step (1) is to adjust the pH of the starch slurry to a value between 3 and 5 then completely gelatinize and dissolve it by heating at above 100°C.

21. A process according to claim 19, wherein the α-1,6-glucosidase to be added in the step (3) is a mixture of two or more varieties of different behaviors.

22. A process for producing maltitol which comprises the step of (1) completely gelatinizing and dissolving a starch slurry by heating it at a temperature ranging from 80° to 180°C., (2) cooling the starch solution and completely liquefying it by adding α-amylase at a temperature ranging from 70° to 95°C., (3) adding α-1,6-glucosidase to the reaction solution and further effecting the reaction at a temperature between 45° and 60°C. until β-amylolysis is concluded, and (4) thereafter adjusting the pH of the purified maltose by adding $CaCO_3$ thereto in an amount of 0.05 – 0.6 percent by weight per weight of maltose, and catalytically reducing the saccharified solution thus produced with the addition of Raney nickel catalyst and by the introduction of hydrogen gas at a temperature of 80° to 150°C. and a pressure of 20 to 100 kg/cm².

23. A process according to claim 22 wherein the step (1) is to adjust the pH of the starch slurry to a value between 3 and 5 then completely gelatinize and dissolve it by heating at above 100°C.

24. A process according to claim 22 wherein the α-1,6-glucosidase to be added in the step (3) is a mixture of two or more varieties of different behaviors.

* * * * *